United States Patent
Sugawara

(10) Patent No.: US 9,737,896 B2
(45) Date of Patent: Aug. 22, 2017

(54) SCREW CONVEYOR TYPE SEPARATION APPARATUS AND WASTEWATER TREATMENT SYSTEM

(71) Applicant: Metawater Co., Ltd., Tokyo (JP)

(72) Inventor: Yoshiyuki Sugawara, Tokyo (JP)

(73) Assignee: Metawater Co., Ltd., Chiyoda-Ku (JP)

(*) Notice: Subject to any disclaimer, the term of this patent is extended or adjusted under 35 U.S.C. 154(b) by 0 days.

(21) Appl. No.: 15/345,611

(22) Filed: Nov. 8, 2016

(65) Prior Publication Data
US 2017/0050400 A1    Feb. 23, 2017

Related U.S. Application Data

(63) Continuation of application No. PCT/JP2015/065473, filed on May 28, 2015.

(30) Foreign Application Priority Data

Jun. 4, 2014    (JP) ................. 2014-116186

(51) Int. Cl.
   *B04B 1/20*    (2006.01)
   *B30B 9/12*    (2006.01)
   (Continued)

(52) U.S. Cl.
   CPC ............ *B04B 1/20* (2013.01); *B01D 43/00* (2013.01); *B30B 9/121* (2013.01); *B30B 9/14* (2013.01);
   (Continued)

(58) Field of Classification Search
   CPC ... B04B 1/20; B04B 2011/2041; B30B 9/121; B30B 9/14; B01D 43/00; C02F 3/00; C02F 9/00; C02F 11/02
   See application file for complete search history.

(56) References Cited

U.S. PATENT DOCUMENTS

| | | | |
|---|---|---|---|
| 1,333,249 A | 3/1920 | Fiddyment | |
| 4,457,227 A | 7/1984 | Koch | |
| 4,731,182 A * | 3/1988 | High | B04B 1/20 210/374 |

FOREIGN PATENT DOCUMENTS

| | | |
|---|---|---|
| JP | S57-118899 A | 7/1982 |
| JP | S60-111798 A | 6/1985 |
| | (Continued) | |

OTHER PUBLICATIONS

International Search Report and Written Opinion, International Application No. PCT/JP2015/065473, dated Jul. 21, 2015 (12 pages).

*Primary Examiner* — David A Reifsnyder
(74) *Attorney, Agent, or Firm* — Burr & Brown, PLLC

(57) ABSTRACT

A casing that squeezes sludge floc at one end portion, a screw shaft, a first screw blade spirally provided on an outer peripheral surface of the screw shaft, and a second screw blade provided side by side along a longitudinal direction of the screw shaft with the first screw blade with a predetermined interval from the first screw blade, are included. In the casing, a concentration zone and a separated liquid zone, which are substantially divided from each other by the first screw blade and the second screw blade, are formed. By rotation of the screw shaft, the sludge floc is squeezed in the concentration zone to be separated into sludge and separated liquid, and the separated liquid is moved rearward in the separated liquid zone to be discharged, while the sludge is discharged outside.

11 Claims, 7 Drawing Sheets

(51) Int. Cl.
  *B30B 9/14*    (2006.01)
  *B01D 43/00*   (2006.01)
  *C02F 3/00*    (2006.01)
  *C02F 9/00*    (2006.01)
  *C02F 11/02*   (2006.01)
  *C02F 11/12*   (2006.01)

(52) U.S. Cl.
  CPC ............ *C02F 9/00* (2013.01); *C02F 11/12* (2013.01); *B04B 2001/2041* (2013.01); *C02F 3/00* (2013.01)

(56) References Cited

FOREIGN PATENT DOCUMENTS

| JP | H08-309589 A  | 11/1996 |
| JP | H11-300400 A  | 11/1999 |
| JP | 2001-170697 A | 6/2001  |
| JP | 2001-321989 A | 11/2001 |
| JP | 2009-011993 A | 1/2009  |
| JP | 2014-000486 A | 1/2014  |

\* cited by examiner

SCREW CONVEYOR TYPE SEPARATION APPARATUS AND WASTEWATER TREATMENT SYSTEM

CROSS-REFERENCE TO RELATED APPLICATIONS

This application is a continuation application of PCT international Application No. PCT/JP2015/065473, which designates the United States, incorporated herein by reference, and which claims the benefit of priority from Japanese Patent Application No. 2014-116186, filed on Jun. 4, 2014, the entire contents of all of which are incorporated herein by reference.

DESCRIPTION

Field

The present invention relates to a screw conveyor type separation apparatus, which uses screw blades, and to a wastewater treatment system.

Background

Conventionally, methods adopted in so-called separation apparatuses, such as concentrators and dewatering machines, include the centrifugation method, the flotation concentration method, the screen concentration and dewatering method, and the like. Further, screw press dewatering apparatuses have been used, each of which performs filtration dewatering of sludge, such as sewage or industrial wastewater that is high in water content, the sludge being an object to be treated, while conveying the object to be treated, by feeding the object to be treated into a cylindrically shaped filter body and rotating a screw provided inside this filter body. In a screw press dewatering apparatus, a cylindrically shaped screen, which is formed of mesh or a punching plate having many pores (filtration pores) formed as openings on an outer peripheral surface thereof, is generally used as a filter body for performing filtration dewatering of an object to be treated, such as sludge (see Patent Literature 1).

CITATION LIST

Patent Literature

Patent Literature 1: Japanese Laid-open Patent Publication No. 08-309589

SUMMARY

Technical Problem

However, the cost for dewatering apparatuses adopting the above described dewatering concentration methods becomes high, with the high cost of equipment and the high cost of periodic inspection. Specifically, in the centrifugation method, the power consumption becomes large; in the flotation concentration method, the site area becomes large; and in the screen concentration and dewatering method, a large quantity of cleaning water becomes necessary. Therefore, a separation apparatus with reduced running costs including the cost of equipment and the cost of periodic inspection has been desired.

The present invention has been made in view of the above, and an object thereof is to provide a screw conveyor type separation apparatus and a wastewater treatment system, which enable a liquid component to be efficiently separated from an object to be treated including liquid, and which are able to be maintained and controlled at low cost.

Solution to Problem

To solve the problem and achieve the object above, a screw conveyor type separation apparatus in this invention includes a casing having an opening provided at one of end portions thereof, the opening enabling a treatment object that has been squeezed to be discharged therefrom, the casing having a substantially cylindrical shape; a screw shaft penetrating inside the casing along a longitudinal direction of the cylindrical shape of the casing; a first screw blade that is spirally provided on an outer peripheral surface of the screw shaft in the casing and that rotates with rotation of the screw shaft around a shaft center thereof; and a second screw blade that is spirally provided on the outer peripheral surface of the screw shaft in the casing, that is provided side by side with the first screw blade with a predetermined interval from the first screw blade, along a longitudinal direction of the screw shaft, and that rotates with the rotation of the screw shaft around the shaft center thereof. In the casing, a first region and a second region substantially divided from each other by the first screw blade and the second screw blade are formed, and the screw conveyor type separation apparatus is configured to be able to, by the rotation of the screw shaft, in the first region, squeeze the treatment object while moving the treatment object in a predetermined direction towards the one of end portions, separate a liquid component from the treatment object, and move the liquid component to the second region, in the second region, move the liquid component oppositely to the predetermined direction and discharge the liquid component to outside.

In the screw conveyor type separation apparatus in this invention, a cylindrical inner peripheral side surface of the casing and the first screw blade and second screw blade have a gap therebetween, the gap allowing the liquid component to pass therethrough, and not allowing the treatment object to pass therethrough.

In the screw conveyor type separation apparatus in this invention, at the other end portion opposite to the one of end portions of the casing, a drainage port configured to allow the liquid component to be discharged therefrom is formed.

In the screw conveyor type separation apparatus in this invention, the drainage port is formed lower than the screw shaft along a vertical direction.

In the screw conveyor type separation apparatus in this invention, the drainage port is formed upper than the screw shaft along a vertical direction.

In the screw conveyor type separation apparatus in this invention, the one of end portions of the casing is reduced in diameter.

In the screw conveyor type separation apparatus in this invention, a separated liquid damming means that dams up the liquid component is provided between the first screw blade and the second screw blade near the one of end portions in the second region.

In the screw conveyor type separation apparatus in this invention, the casing has an input port configured to allow the treatment object to be fed into the casing, and a cover is provided between the first screw blade and the second screw blade, the cover covering at least an overlapping region along a horizontal direction between the input port and the second region.

A wastewater treatment system in this invention includes a solid-liquid separation tank for separating sludge from organic wastewater; and the screw conveyor type separation apparatus of this invention. The screw conveyor type separation apparatus is configured to be able to concentrate the sludge discharged from the solid-liquid separation tank and return, to the solid-liquid separation tank, the separated liquid generated upon the concentration of the sludge.

In the wastewater treatment system in this invention, the screw conveyor type separation apparatus is provided in the solid-liquid separation tank.

A wastewater treatment system in this invention includes a reaction tank for performing biological treatment on organic wastewater; a solid-liquid separation tank for separating sludge from the organic wastewater; and the screw conveyor type separation apparatus of this invention. The screw conveyor type separation apparatus is configured to be able to withdraw sludge and concentrate the sludge, return the concentrated sludge to the reaction tank, and supply, to the solid-liquid separation tank, the separated liquid generated upon the concentration of the sludge.

Advantageous Effects of Invention

By a screw conveyor type separation apparatus and a wastewater treatment system according to the present invention, a liquid component is able to be efficiently separated from an object to be treated including liquid, and maintenance and control thereof are able to be achieved at low cost.

DESCRIPTION OF EMBODIMENTS

Hereinafter, an embodiment of the present invention will be described with reference to the drawings. In all of the drawings of the following embodiment, the same signs will be appended to the same or corresponding portions. Further, the present invention is not limited by the embodiment described below.

Figure 1:
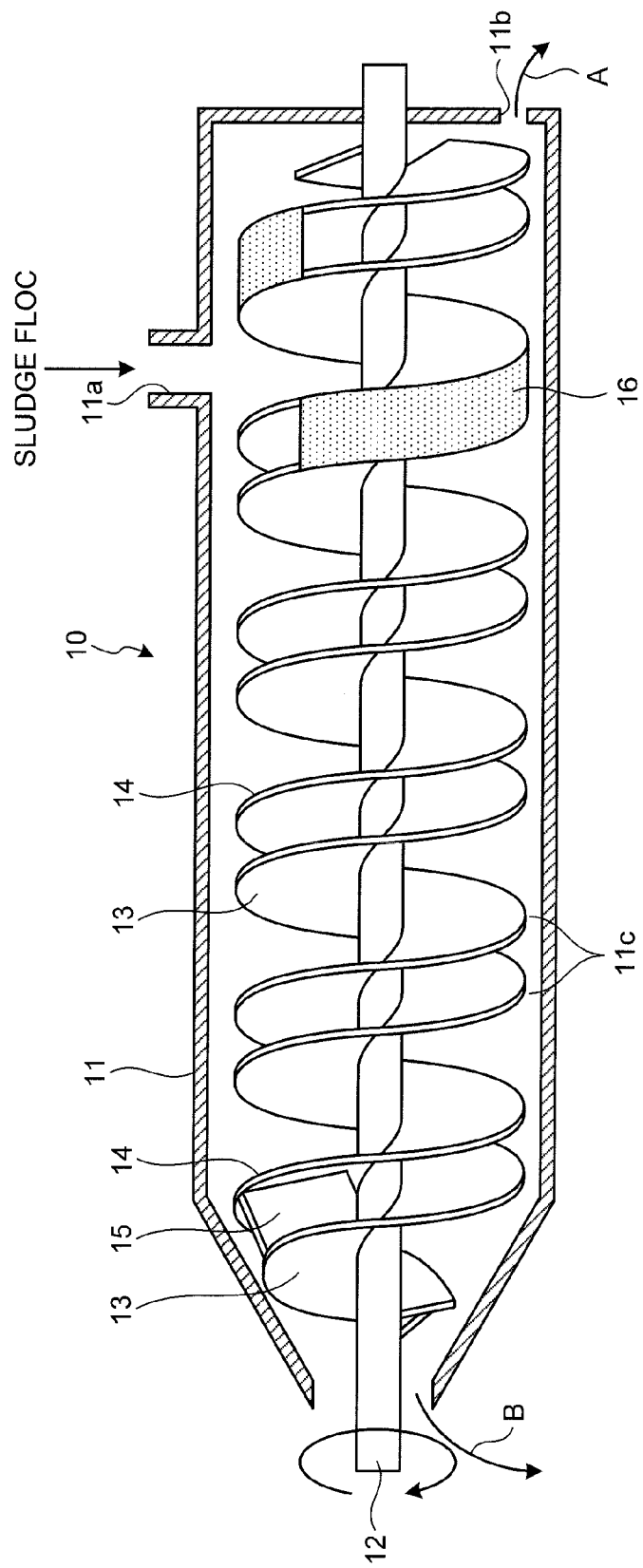
FIG. 1 is a partial cross sectional view depicting a screw conveyor type separation apparatus according to an embodiment of the present invention.

First of all, a screw conveyor type separation apparatus according to an embodiment of the present invention will be described. FIG. 1 is a partial cross sectional view of the screw conveyor type separation apparatus according to this embodiment.

As depicted in FIG. 1, a screw conveyor type separation apparatus 10 according to this embodiment is configured to have a casing 11, a screw shaft 12, a first screw blade 13, a second screw blade 14, a baffle 15, and a screw cover 16.

The casing 11 has a substantially cylindrical shape with one of end portions thereof reduced in diameter. At this one of end portions with the reduced diameter, an opening for discharging an object to be treated is formed. Further, at a side portion of the cylindrical shape of the casing 11, an input port 11a formed of an opening, through which the object to be treated is able to be fed, is provided, the object to be treated being, for example, sludge floc. At the other end portion of the casing 11 opposite to the reduced diameter side end portion, a drainage port 11b formed of an opening, through which liquid is able to be discharged, is formed. In this embodiment, the drainage port 11b is formed below the screw shaft 12 along a vertical direction, that is, at a lower portion side of the casing 11.

The screw shaft 12 serving as a screw shaft has a columnar shape. The screw shaft 12 is provided inside the casing 11 to penetrate through the casing 11 along a longitudinal direction of the cylindrical shape of the casing 11. At least one end portion of the screw shaft 12 is pivotally supported by a bearing and coupled to a motor (both of which are not depicted).

The first screw blade 13 is wound around an outer peripheral surface of the screw shaft 12, in a direction that is the same as a rotating direction of the screw shaft 12, from the other end portion opposite to the reduced diameter side end portion of the casing 11 (from the bearing side) towards the reduced diameter side end portion. That is, if the rotating direction of the screw shaft 12 is clockwise when viewed from the bearing side to the reduced diameter side end portion, the first screw blade 13 is provided in a so-called Z-twisted (right handed) spiral shape. In contrast, if the rotating direction of the screw shaft 12 is anticlockwise when viewed from the bearing side to the reduced diameter side end portion, the first screw blade 13 is provided in a so-called S-twisted (left handed) spiral shape. Further, the second screw blade 14 is provided on the outer peripheral surface of the screw shaft 12, in a spiral shape similar to that of the first screw blade 13, and is provided side by side with the first screw blade 13 at a position shifted from the first screw blade 13 with a predetermined interval along a longitudinal direction of the screw shaft 12. A concentration zone Q, which is a first region, is formed between the first screw blade 13 and the second screw blade 14 closer to the one end portion with the reduced diameter than the first screw blade 13. Further, a separated liquid zone R, which is a second region, is formed between the second screw blade 14 and the first screw blade 13 closer to the one end portion with the reduced diameter than the second screw blade 14. That is, by the first screw blade 13 and the second screw blade 14, the concentration zone Q and the separated liquid zone R are substantially divided from each other in the casing 11.

Further, between an outer periphery of the first screw blade 13 and a cylindrical inner peripheral side surface of the casing 11, and between an outer periphery of the second screw blade 14 and the cylindrical inner peripheral side surface of the casing 11, a slit 11c, which is a minute gap, is formed. This slit 11c, the minute gap, is a gap having an interval, through which the object to be treated, such as the sludge floc or sludge 18, is unable to pass, and liquid, such as separated liquid 17, is able to pass, and is specifically, for example, a gap of about 1 mm to 2 mm. Thereby, the concentration zone Q and the separated liquid zone R are in a state of communicating with each other at a region of the slit 11c, while being isolated from each other in a region other than the region of the slit 11c.

A baffle 15 serving as a separated liquid damming means is provided along a radial direction of the screw shaft 12, between the first screw blade 13 and the second screw blade 14 near the one end portion of the casing 11 with the reduced diameter. The screw cover 16 is provided in a region between the first screw blade 13 and the second screw blade 14 forming the separated liquid zone R, the region overlapping an opening region of the input port 11a. When the sludge floc is fed in from the input port 11a, this screw cover 16 prevents the sludge floc from being fed into the separated liquid zone R.

Figure 2:
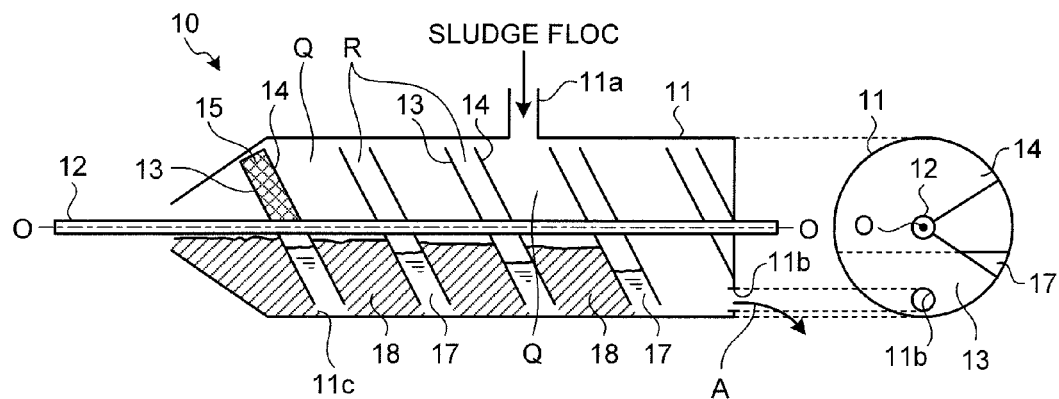
FIG. 2 is a schematic diagram for explanation of an operation of the screw conveyor type separation apparatus according to the embodiment of the present invention.
Figure 3:
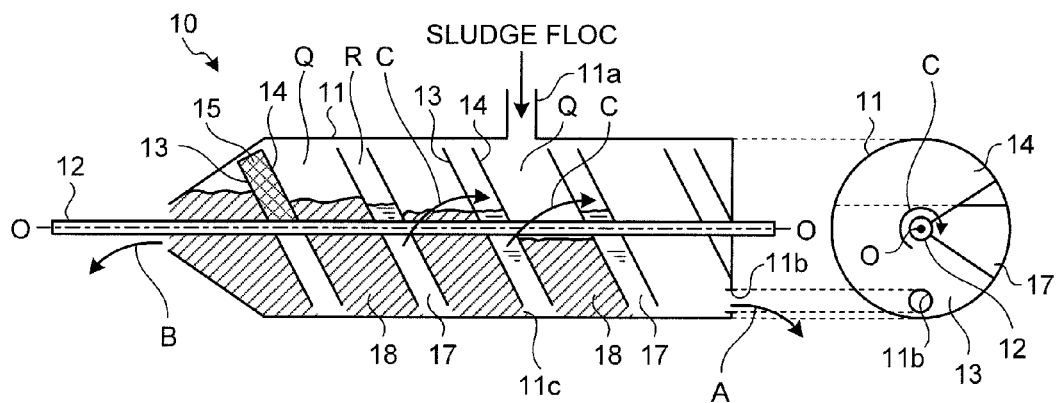
FIG. 3 is a schematic diagram for explanation of the operation of the screw conveyor type separation apparatus according to the embodiment of the present invention.
Figure 4:
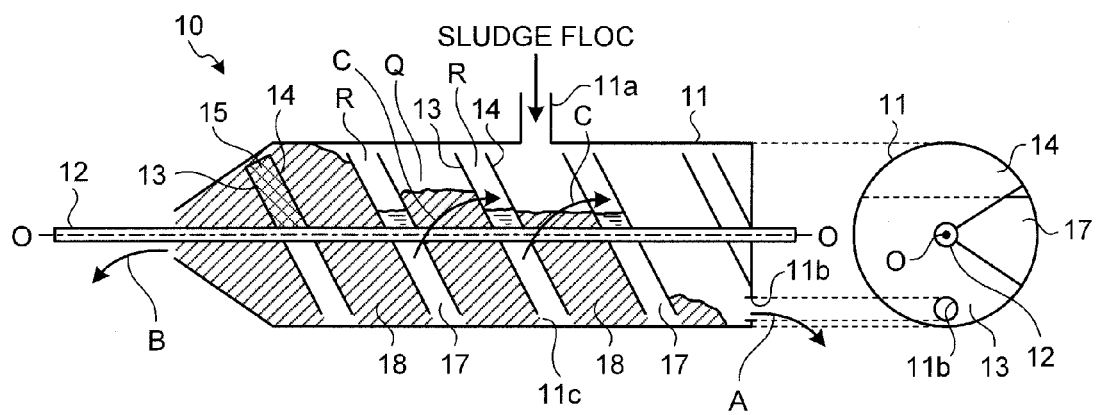
FIG. 4 is a schematic diagram for explanation of the operation of the screw conveyor type separation apparatus according to the embodiment of the present invention.
Figure 5:
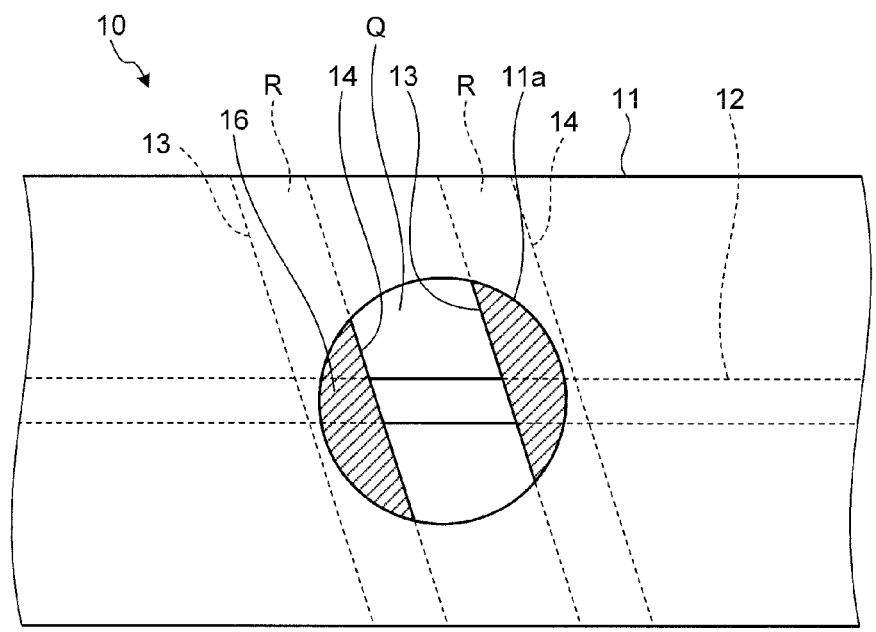
FIG. 5 is a top view for explanation of a relation between an input port in the screw conveyor type separation apparatus according to the embodiment of the present invention, and a separated liquid zone and a concentration zone.
Figure 6:
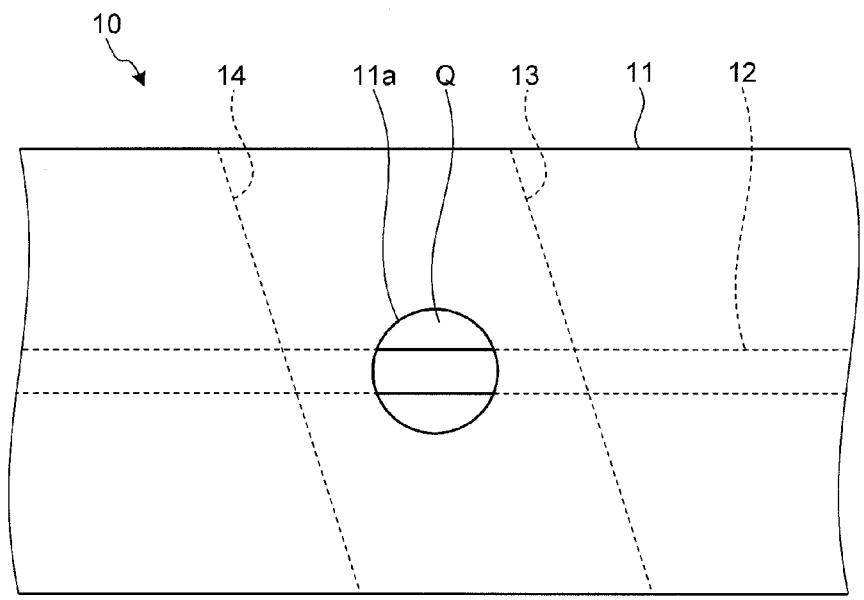
FIG. 6 is a top view for explanation of a modification of the input port in the screw conveyor type separation apparatus according to the embodiment of the present invention.

Next, an operation of the screw conveyor type separation apparatus 10 configured as described above, and movement of the object to be treated will be described. FIG. 2, FIG. 3, and FIG. 4 are respectively schematic diagrams for explanation of the operation of the above described screw conveyor type separation apparatus 10 as viewed from a side thereof and from the other end of the shaft center O. Further, FIG. 5 and FIG. 6 are schematic diagrams of the input port 11a of the casing 11 as viewed from above.

As depicted in FIG. 2, firstly, the sludge floc is fed into the casing 11 from the input port 11a. Upon this feeding, as depicted in FIG. 5, a region of an opening portion of the input port 11a along a horizontal direction and a region of the separated liquid zone R along the horizontal direction may overlap each other. In this case, the screw cover 16 is provided in the overlapping region along the horizontal direction between the opening portion of the input port 11a and the separated liquid zone R, in the region between the first screw blade 13 and the second screw blade 14. Therefore, the sludge floc is prevented from being fed into the separated liquid zone R. As depicted in FIG. 6, according to properties of the sludge floc, a diameter of the input port 11a may be made sufficiently small as compared to a region of the concentration zone Q along a horizontal plane. In this case, the opening portion of the input port 11a and the region of the separated liquid zone R along the horizontal direction are able to be made not to overlap each other. Thus, without the providing the screw cover 16, all of the sludge floc is able to be fed into the concentration zone Q through the input port 11a. By these configurations, the sludge floc is fed into the concentration zone Q without being fed into the separated liquid zone R.

Thereafter, as depicted in FIG. 2, the screw shaft 12 is rotated around its shaft center O. Thereby, the sludge floc is moved in the concentration zone Q in a predetermined direction towards the one end portion (hereinafter, forward) where the opening of the casing 11 is provided, by rotation of the first screw blade 13. The sludge floc is gradually squeezed by the movement caused by the rotation of the first screw blade 13, and friction between the sludge floc and the inner peripheral surface of the casing 11, the friction associated with this rotation. Thereby, the separated liquid 17, which is a liquid component, is separated from the sludge floc, and water content of the sludge 18, which is a solid component resulting from the squeezing of the sludge floc, is reduced. The separated sludge 18 stays in the concentration zone Q and moves forward inside the casing 11.

The separated liquid 17, which is the separated liquid component, gradually enters the separated liquid zone R through the slit 11c between the first screw blade 13 and the casing 11, and is stored in the separated liquid zone R. The separated liquid 17 and the sludge 18 are isolated from each other by the first screw blade 13 or second screw blade 14 in the region other than the minute slit 11c. Therefore, the separated liquid 17 and the sludge 18 are isolated from each other in the region other than the region of the slit 11c and are in a non-contact state. Thereby, the separated liquid 17 separated from the sludge floc gradually increases by being stored in the separated liquid zone R.

Further, while the separated liquid zone R is spatially continuous, the stored separated liquid 17 is in a mutually isolated state by the first screw blade 13, the sludge 18, and the second screw blade 14. A small amount of the separated liquid 17 penetrates in the concentration zone Q through the slit 11c between the first screw blade 13 and second screw blade 14 and the casing 11, and enters the separated liquid zone R at the other end portion side (hereinafter, rear side) where the drainage port 11b is provided in the casing 11. From the separated liquid zone R closest to the rear side in the casing 11, the separated liquid 17 seeps out through the slit 11c at a lower portion thereof, and the separated liquid that has seeped out therefrom is discharged from the drainage port 11b as depicted with an arrow A. On the contrary, the separated liquid 17 stored in the separated liquid zone R is moved forward by rotation of the second screw blade 14, but is dammed up by the baffle 15. Due to this damming by the baffle 15, the separated liquid 17 is moved rearward in a direction opposite to the predetermined direction.

As depicted in FIG. 3, when the sludge floc continues to be fed in and the first screw blade 13 and the second screw blade 14 continue to be rotated, the sludge 18 in the concentration zone Q increases and the separated liquid 17 in the separated liquid zone R increases. After the sludge 18 in the concentration zone Q moves forward while being reduced in water content by being squeezed, and is further reduced in water content by being squeezed near the opening of the casing 11 with the reduced diameter, the sludge 18 is discharged outside as depicted with an arrow B.

The separated liquid 17 is moved rearward by being dammed up by the baffle 15 after being moved forward by the rotation of the second screw blade 14 or by being dammed up by the sludge 18 filling the opening of the casing 11, and gradually increases in the separated liquid zone R. When the water level along the vertical direction of the separated liquid 17 in the separated liquid zone R exceeds the height of the screw shaft 12 in the casing 11, the separated liquid 17 overflows so as to climb over the shaft center O of the screw shaft 12 and flows into the separated liquid zone R at the rearer side. As described above, the separated liquid 17 sequentially moves to the rearer side separated liquid zone R in the casing 11 as depicted with an arrow C, according to the water level difference between the fronter side and the rearer side within the separated liquid zone R. The separated liquid 17 that has sequentially moved rearward in the separated liquid zone R is finally discharged outside from the drainage port 11b as depicted with the arrow A.

Further, as depicted in FIG. 4, when the sludge floc continues to be fed in and the first screw blade 13 and the second screw blade 14 continue to be rotated, the separated liquid 17 moves rearward in the separated liquid zone R as depicted with the arrows C and is finally discharged outside as depicted with the arrow A. Besides, if the amount of increase of the sludge 18 separated from the sludge floc supplied into the casing 11 exceeds the amount of sludge 18 discharged, the total amount of the sludge 18 in the concentration zone Q increases. When the height of the sludge 18 accumulated in the concentration zone Q exceeds the height of the screw shaft 12 along the vertical direction in the casing 11, a part of the sludge 18 may climb over the screw shaft 12 and fall into the rearer side concentration zone Q. Thereby, the sludge 18 is filled in the concentration zone Q sequentially from the front while being discharged from the opening of the casing 11 as depicted with the arrow B. By the sludge 18 being filled in the concentration zone Q at the front side opening, the separated liquid 17 is dammed up at the opening of the casing 11 and the separated liquid 17 is prevented from being discharged from the opening. Further, by the sludge 18 filled at the front, the sludge 18 moving forward from the rear is further squeezed, and is reduced in water content even more. As described above, by the screw conveyor type separation apparatus 10 according to this embodiment, the squeezing of the sludge 18 and the separation into the separated liquid 17 and the sludge 18 are executed concurrently with each other.

MODIFICATION

Figure 7:
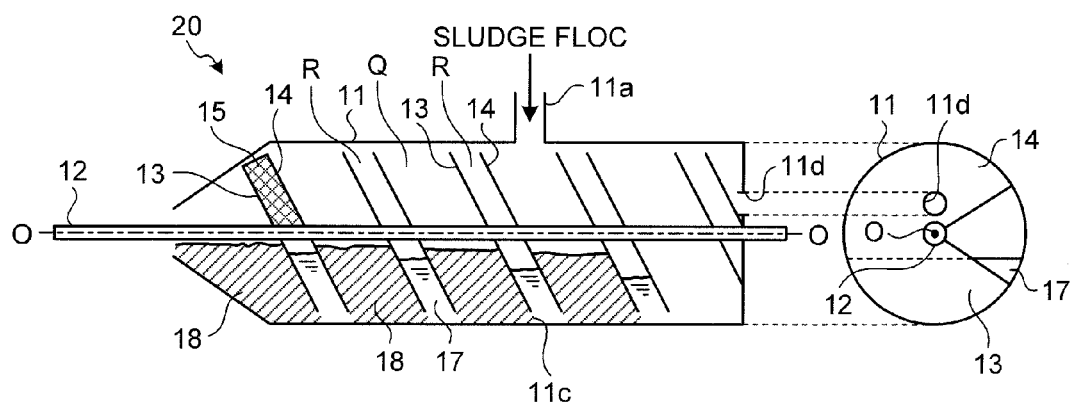
FIG. 7 is a schematic diagram for explanation of an operation of a screw conveyor type separation apparatus according to a modification of the embodiment of the present invention.
Figure 8:
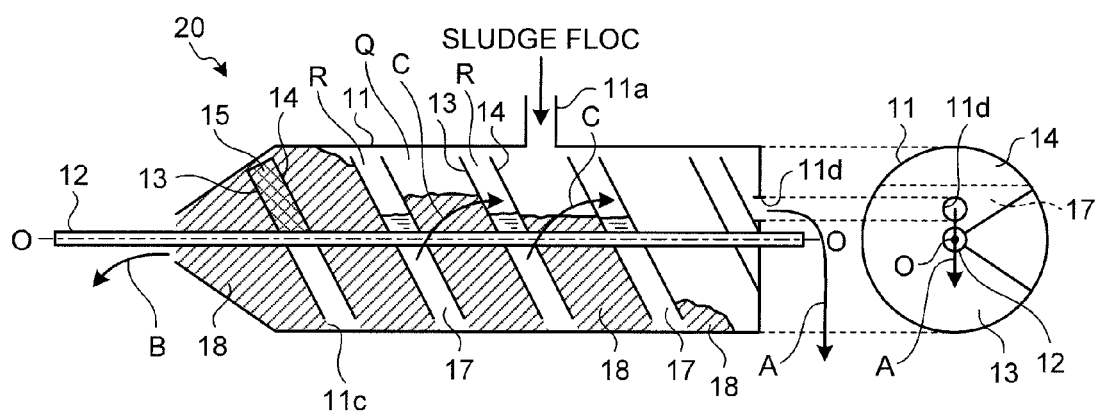
FIG. 8 is a schematic diagram for explanation of the operation of the screw conveyor type separation apparatus according to the modification of the embodiment of the present invention.

Next, a screw conveyor type separation apparatus according to a modification of the embodiment of the present invention will be described. FIG. 7 and FIG. 8 are respectively schematic diagrams for explanation of a screw conveyor type separation apparatus 20 according to the modification and its operation, as viewed from a side thereof and from one end of the shaft center O.

As depicted in FIG. 7 and FIG. 8, the screw conveyor type separation apparatus 20 according to the modification has, differently from the above described screw conveyor type separation apparatus 10, a drainage port 11d provided at a rear side end portion thereof, the drainage port 11d formed above the screw shaft 12 along a vertical direction, that is, at an upper portion of the other end portion of the casing 11. The rest of the configuration is similar to that of the screw conveyor type separation apparatus 10 according to the embodiment, and thus description thereof will be omitted.

As depicted in FIG. 7, in the screw conveyor type separation apparatus 20, firstly, sludge floc is fed into the concentration zone Q inside the casing 11 from the input port 11a. Thereafter, the screw shaft 12, the first screw blade 13, and the second screw blade 14 are rotated with the shaft center O being the axis of rotation, and the sludge floc is moved while being squeezed, forward in the concentration zone Q. Thereby, the sludge floc is gradually separated into the separated liquid 17 and the sludge 18. The sludge 18 is moved forward in the concentration zone Q in the casing 11 while being reduced in water content, squeezed further near the opening with the reduced diameter to be further reduced in water content, and thereafter discharged outside as depicted with the arrow B. In contrast, the separated liquid 17 is moved forward by the rotation of the second screw blade 14, but is dammed up by the baffle 15 or the filled sludge 18, and is stored in the separated liquid zone R with gradually increasing.

When the water level of the separated liquid 17 in the separated liquid zone R exceeds the height of the screw shaft 12 along the vertical direction in the casing 11, the separated liquid 17 overflows so as to climb over the screw shaft 12 as depicted with the arrows C. The overflown separated liquid 17 flows into the rearer side separated liquid zone R and increases the amount of the separated liquid 17 in the rearer side separated liquid zone R. By this movement of the separated liquid 17 being caused sequentially, the separated liquid 17 is sequentially moved rearward in the separated liquid zone R. When the water level of the separated liquid 17 is continuously at a position higher than the screw shaft 12 along the vertical direction, the separated liquid 17 is in a so-called steady state. In the steady state, the separated liquid 17 stays in the place by being moved rearward by the baffle 15 or the sludge 18 filled in the opening while also being moved forward. When the separated liquid 17 is stored rearward and the water level of the separated liquid 17 at the rearest side in the separated liquid zone R becomes, along the vertical direction, equal to or higher than the height of the position at which the drainage port 11d is formed, the separated liquid 17 is discharged outside from the drainage port 11d as depicted with the arrow A.

Further, as depicted in FIG. 8, when the sludge floc continues to be fed in and the first screw blade 13 and the second screw blade 14 continue to be rotated, and the amount of increase of the sludge 18 exceeds the amount of discharge of the sludge 18, the total amount of the sludge 18 in the concentration zone Q is increased. While the sludge 18 is moved forward while being squeezed by the rotation of the first screw blade 13, a part of the sludge 18 climbs over the screw shaft 12 and falls into the rearer side concentration zone Q. By such movement of the sludge 18, the sludge 18 is sequentially filled in the concentration zone Q from the front, while being discharged from the opening of the casing 11 as depicted with the arrow B. By the sludge 18 filled at the front, the sludge 18 moving forward from the rear is further squeezed, and the separated liquid 17 is dammed up and moved rearward. The rest of the operation of the screw conveyor type separation apparatus 20 and the rest of the movement of the sludge 18 and the separated liquid 17 are similar to those of the above described first embodiment, and thus description thereof will be omitted.

According to the above described embodiment of the present invention, the inside of the casing 11 is isolated into the separated liquid zone R and the concentration zone Q, excluding the slit 11c, by the two screw blades, which are the first screw blade 13 and the second screw blade 14. Thereby, with a simple configuration, the separated liquid 17 and the sludge 18 are able to be separated from the sludge floc, and the sludge 18 is able to be prevented from being mixed again with the separated liquid 17 that has been separated. Therefore, the sludge 18 and the separated liquid 17 are able to be separated from each other even more efficiently.

Further, in the conventional screw press dewatering apparatus described in Patent Literature 1 or the like, only the separated liquid is discharged from the pores, and the solid component is retained inside the filter body. Therefore, the pores on the outer peripheral surface of the filter body are set with minute openings allowing the separated liquid to pass therethrough without allowing the solid content to pass therethrough. In contrast, by the above described screw conveyor type separation apparatus 10 or 20 according to the embodiment, since such a filter body or the like is not required, the screw conveyor type separation apparatus 10 or 20 itself is able to be manufactured easily and inexpensively.

Further, in the conventional screw press dewatering apparatus, time and effort have been required to remove the solid content, such as the sludge, which clogs the minute pores of the filter body, and maintenance including large-scaled cleaning by completely stopping the operation of the dewatering apparatus has been required to remove the solid content clogging the minute pores. In contrast, since the above described screw conveyor type separation apparatus 10 or 20 according to the embodiment does not have any mesh structure, large-scaled maintenance, such as an overhaul for cleaning the apparatus, will be unnecessary, and without using cleaning water all the time, use of a small amount of cleaning water upon stoppage of the operation will be sufficient. Furthermore, the electric power consumed in the above described screw conveyor type separation apparatus 10 or 20 is only for driving power of the screw shaft 12, and since the number of parts used therein is small, parts to be replaced, which are a cause of high cost, are able to be reduced. Moreover, since the sludge 18 is able to be concentrated while being conveyed, the necessity of providing a concentrator separately is reduced.

FIRST EXAMPLE

Figure 9:
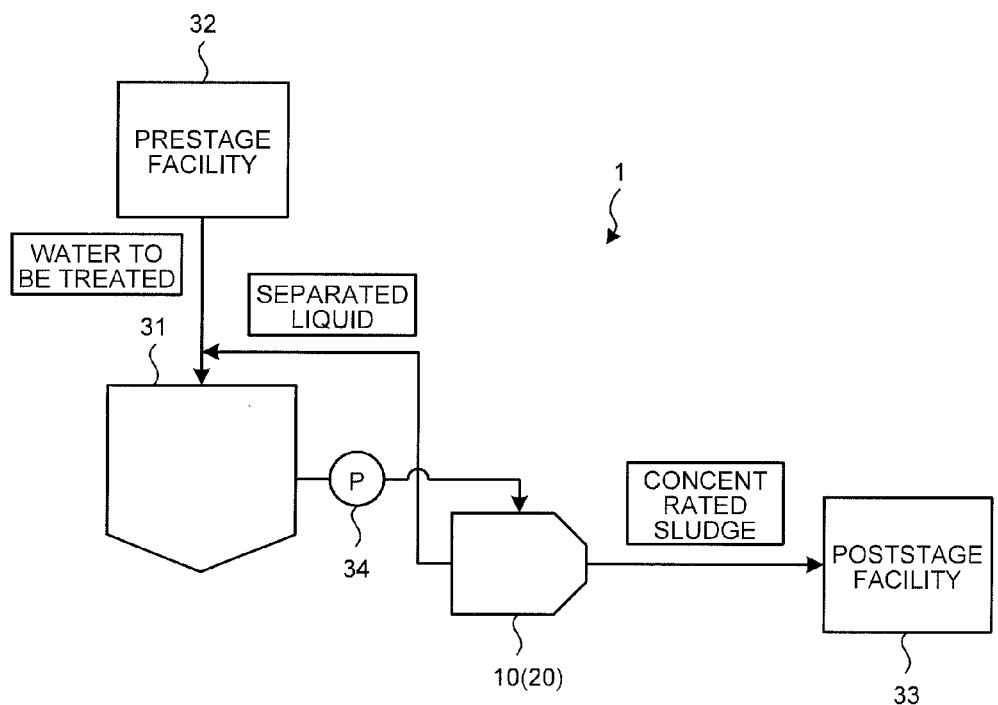
FIG. 9 is a diagram of a schematic configuration depicting a wastewater treatment system according to a first example of the present invention.

Next, a first example, which is a wastewater treatment system including the above described screw conveyor type separation apparatus according to the embodiment, will be described. FIG. 9 is a diagram of a configuration depicting a part of the wastewater treatment system according to this first example.

As depicted in FIG. 9, a wastewater treatment system 1 according to this first example includes: a sedimentation tank 31; a prestage facility 32 that is arranged upstream of the sedimentation tank 31; a poststage facility 33 arranged downstream from the sedimentation tank 31; a withdrawing pump 34; and the screw conveyor type separation apparatus 10 (or 20). The sedimentation tank 31 is a solid-liquid separation tank that causes sedimentation of water to be treated supplied from the prestage facility 32, into separated liquid and sludge. The prestage facility 32 is a facility that is configured to have various treatment tanks, such as reaction tanks for treating organic wastewater, such as, for example, sewage. The poststage facility 33 is a facility, which includes, for example, an incinerator or the like. The poststage facility 33 is a facility in which incineration and waste disposal are performed for the sludge (the concentrated sludge) discharged from the screw conveyor type separation apparatus 10. The withdrawing pump 34 is a sludge withdrawing means for withdrawing the sludge from the sedimentation tank 31 and supplying the withdrawn sludge to the screw conveyor type separation apparatus 10.

In this wastewater treatment system 1, at least a part of the water to be treated discharged from the prestage facility 32 is supplied to the sedimentation tank 31. The sedimentation tank 31 causes sedimentation of the supplied water to be treated into the separated liquid and the sludge. The separated sludge is withdrawn from a lower portion of the sedimentation tank 31 by the withdrawing pump 34 and supplied to the screw conveyor type separation apparatus 10. The withdrawn sludge is conveyed into the screw conveyor type separation apparatus 10 through the input port 11a (see FIG. 1).

The screw conveyor type separation apparatus 10, similarly to the above described embodiment, carries out the separation into the separated liquid 17 and the sludge 18. The separated liquid 17, which is one of the separated items, is returned to the sedimentation tank 31. The sludge 18, which is the other one of the separated items, is conveyed as the concentrated sludge to the poststage facility 33 and subjected to the incineration and the waste disposal. As described above, wastewater treatment according to this first example is executed.

According to the above described first example, by use of the above described screw conveyor type separation apparatus 10 according to the embodiment, the sludge 18 withdrawn from the sedimentation tank 31 is concentrated, and the separated liquid 17 is returned to the sedimentation tank 31. Thereby, the concentration of the concentrated sludge 18 is able to be improved, and the maintenance and control of the sedimentation tank 31 is able to be improved significantly. That is, intermediate water is often present in the sedimentation tank 31. When such intermediate water is present, water is more preferentially withdrawn than the sludge upon withdrawing of the sludge. Therefore, there has been a problem that the concentration of the concentrated sludge is not increased even if the sludge 18 is compressed. Against this problem, according to the above described first example, since the screw conveyor type separation apparatus 10 according to the embodiment of the present invention is arranged downstream from the sedimentation tank 31, only the intermediate water is able to be separated from the withdrawn sludge 18 and returned to the sedimentation tank 31. Therefore, since the concentration of the concentrated sludge 18 is able to be improved, even if intermediate water is included in the sedimentation tank 31 as conventionally been included, the concentration of the concentrated sludge 18 is able to be improved. In addition, since the above described screw conveyor type separation apparatus 10 according to the embodiment is able to be manufactured at low cost, the wastewater treatment system 1 is also able to be realized at low cost. Moreover, even if the sludge 18 causes clogging in the casing 11, if the screw shaft 12 is rotated reversely to the rotation upon the concentration of the sludge 18, the clogging is able to be removed easily.

FIRST MODIFICATION OF FIRST EXAMPLE

Figure 10:
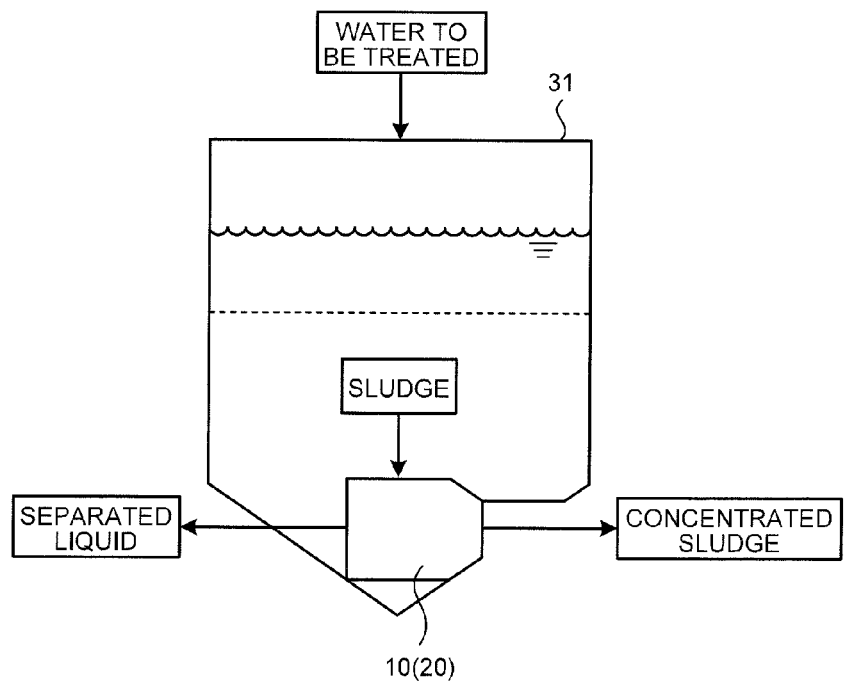
FIG. 10 is a schematic diagram depicting a modification of the first example of the present invention.

Next, a first modification of the above described first example will be described. FIG. 10 is a schematic diagram depicting the sedimentation tank 31, for explanation of the modification of the first example. As depicted in FIG. 10, in this first modification, the screw conveyor type separation apparatus 10 according to the embodiment is provided at a lower portion of the sedimentation tank 31. The screw conveyor type separation apparatus 20 may be used instead. Sludge that has settled at the lower portion of the sedimentation tank 31 is supplied into the screw conveyor type separation apparatus 10 through the input port 11a (see FIG. 1) by use of a sludge collecting device (not depicted), such as a funnel. The screw conveyor type separation apparatus 10 discharges the sludge 18 that has been concentrated (the concentrated sludge) to outside and returns the separated liquid 17 that has been separated, into the sedimentation tank 31, through the inside or outside, via a piping (not depicted). The separated liquid 17 may also be discharged outside. The rest of the configuration is similar to that of the above described first example.

SECOND MODIFICATION OF FIRST EXAMPLE

Further, in a second modification, if a gravity settling tank, such as the sedimentation tank 31, is provided upstream of the screw conveyor type separation apparatus 10, a picket fence (not depicted), which is formed of a bar shaped member placed upright on an upper side of a rake that rakes up the sludge, may be provided in the sedimentation tank 31. By providing the picket fence, settling of the sludge 18 in the sedimentation tank 31 is able to be promoted and so-called flocculation is thus promoted. Therefore, the separated liquid 17 and the sludge 18 are able to be even more efficiently separated from each other by the screw conveyor type separation apparatus 10 and the solid-liquid separability is able to be improved largely.

SECOND EXAMPLE

Figure 11:
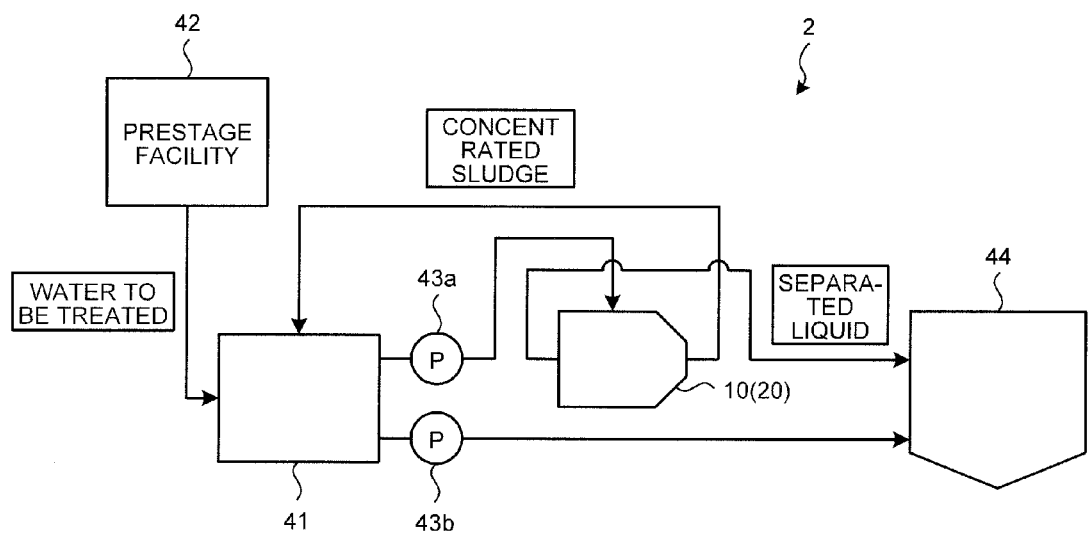
FIG. 11 is a diagram of a schematic configuration depicting a wastewater treatment system according to a second example of the present invention.

Next, a second example, which is a wastewater treatment system including the above described screw conveyor type separation apparatus 10 according to the embodiment, will be described. FIG. 11 is a diagram of a configuration depicting a part of a wastewater treatment system 2 according to this second example.

As depicted in FIG. 11, this wastewater treatment system 2 according to the second example includes: a reaction tank 41; a prestage facility 42 arranged upstream of the reaction tank 41; a sedimentation tank 44 arranged downstream from the reaction tank 41; withdrawing pumps 43a and 43b; and the screw conveyor type separation apparatus 10 (or 20).

The reaction tank 41 is formed of, for example, plural biological reaction tanks. The biological reaction tanks forming the reaction tank 41 are various biological reaction tanks, including, for example, an anaerobic tank, an anoxic tank, and an aerobic tank. The prestage facility 42 is a facility that is configured to have a sand sedimentation tank, an inclination plate sedimentation tank, or the like, for treating organic wastewater, such as, for example, sewage. The withdrawing pump 43a is a sludge withdrawing means for withdrawing sludge, such as activated sludge, from the reaction tank 41, and supplying the withdrawn sludge to the screw conveyor type separation apparatus 10. Similarly, the withdrawing pump 43b is a sludge withdrawing means for withdrawing sludge from the reaction tank 41 and supplying the withdrawn sludge to the sedimentation tank 44 downstream therefrom. The sedimentation tank 44 is a solid-liquid separation tank that causes sedimentation of water to be treated and the separated liquid 17 supplied respectively from the reaction tank 41 and the screw conveyor type separation apparatus 10, into the separated liquid 17 and the sludge 18.

In this wastewater treatment system 2 according to the second example, at least a part of the water to be treated discharged from the prestage facility 42 is supplied to the reaction tank 41. In the reaction tank 41, biological treatments, such as a nitrification treatment and a denitrification treatment, are performed on the water to be treated. The activated sludge in the reaction tank 41 is withdrawn by the withdrawing pumps 43a and 43b. The sludge withdrawn by the withdrawing pump 43a is supplied to the screw conveyor type separation apparatus 10 to be conveyed thereinto through the input port 11a (see FIG. 1).

In the screw conveyor type separation apparatus 10, the conveyed sludge 18 is concentrated and the separated liquid 17 is separated therefrom. The separated liquid 17 that has been separated is supplied to the sedimentation tank 44 downstream therefrom. The sludge and the water to be treated withdrawn from the reaction tank 41 by the withdrawing pump 43b are supplied to the sedimentation tank 44. In the sedimentation tank 44, similarly to the first example, a solid-liquid separation process utilizing gravity settling is executed. As described above, wastewater treatment according to this second example is executed.

According to the above described second example, by use of the above described screw conveyor type separation apparatus 10 according to the embodiment, the sludge 18 is withdrawn from the reaction tank 41 and compressed and concentrated, the compressed and concentrated sludge 18 is returned to the reaction tank 41, and the separated liquid 17 is supplied to the sedimentation tank 44 serving as the solid-liquid separation tank. Thereby, the following problems are able to be solved.

That is, conventionally, a large amount of electric power has been used in operation of a returning pump (not depicted) for returning the sludge 18 to the reaction tank 41 from the sedimentation tank 44. In contrast, according to this second example, since the compressed and concentrated sludge 18 is able to be returned to the reaction tank 41 by use of the above described screw conveyor type separation apparatus 10 according to the embodiment, the electric power required in returning the sludge 18 is able to be reduced significantly. Further, by use of this screw conveyor type separation apparatus 10, solid-liquid separation is able to be carried out sufficiently. Thereby, frequency of the withdrawing of the sludge 18 in the sedimentation tank 44 is able to be reduced, and thus electric power in the wastewater treatment system 2 is able to be reduced and energy is able to be saved.

Further, conventionally, there has been a problem that for a configuration provided with a separation membrane in the reaction tank 41, initial cost and the burden required in the maintenance of the facilities have been large. In contrast, instead of the separation membrane, the low cost screw conveyor type separation apparatus 10 is able to be introduced, and thus the initial cost is able to be reduced. Furthermore, since the screw conveyor type separation apparatus 10 is able to be maintained and controlled easily, the burden of the maintenance is able to be reduced, and thus the maintenance cost is able to be reduced.

Further, according to this second example, since MLSS in the reaction tank 41 are able to be increased; the load in the sedimentation tank 44 is able to be reduced, and the power consumption of the withdrawing pumps 43a and 43b used in the withdrawing of the sludge from the reaction tank 41 is able to be reduced. Therefore, energy is able to be saved in the wastewater treatment system 2.

The embodiment of the present invention has been specifically described above, but the present invention is not limited to the above described embodiment, and various modifications based on the technical ideas of the present invention may be made. For example, any numerical value mentioned in the above described embodiment is just an example, and as necessary, a numerical value different therefrom may be used.

In the above described embodiment, the screw shaft 12 is formed of a columnar shaft, but the screw shaft 12 is not necessarily limited to this shape. For example, the screw shaft 12 may have a so-called diameter expansion shape, so as to gradually increase in diameter from the other end portion of the casing 11, the other end portion where the drainage port 11b or 11d is provided, towards the one end portion side of the casing 11, the one end portion side with the reduced diameter.

Further, in the above described embodiment, the baffle 15 is provided between the first screw blade 13 and the second screw blade 14, near the one end portion of the casing 11, but this baffle 15 may be not provided in the configuration. In this case, by filling the portion reduced in diameter of the casing 11 with the sludge 18, from which the separated liquid 17 has been squeezed out, the separated liquid 17 is able to be dammed up and moved towards the drainage port 11b or 11d.

Further, in the above described embodiment, a solid-liquid separation apparatus that separates sludge floc into solids and water is described as an example, but the present invention is not necessarily limited to the solid-liquid separation of the sludge floc, and may be applied to various methods for separating solids and liquid from each other.

Further, in the above described embodiment, the position of the drainage port 11b or 11d may be changed variously.

Further, in the above described embodiment, although the baffle 15 is provided in the separated liquid zone R, a baffle may be provided in the concentration zone Q.

Further, in the above described embodiment, although the separated liquid 17 is moved from the concentration zone Q to the separated liquid zone R through the slit 11c, the configuration is not necessarily limited to this slit 11c. For example, in at least a part of the first screw blade 13 and the second screw blade 14, a filtration means being meshed or having many minute pores may be provided additionally, and may be configured to be able to move the separated liquid 17 from the concentration zone Q to the separated liquid zone R.

Further, the above described screw conveyor type separation apparatus 10 according to the embodiment may be utilized as a preconcentrator of a dewatering machine, a simple private demand concentrator, a confluence improvement screen, or the like.

In the above described first example of the embodiment, the sludge withdrawn by the withdrawing pump 34 is the sludge that has settled in the sedimentation tank 31, but the sludge is not necessarily limited to the sludge that has settled. For example, floating sludge tends to be generated in the sedimentation tank 31 in summer and the like, and this floating sludge may be withdrawn by the withdrawing pump 34 and supplied to the screw conveyor type separation apparatus 10.

Further, in the above described first example, an example of the combination of the screw conveyor type separation apparatus 10 according to the embodiment and the sedimentation tank 31 has been described, but the present invention is not necessarily limited to this configuration. Specifically, for example, a filtration concentration apparatus may be combined with the screw conveyor type separation apparatus 10. In this case, the above described screw conveyor type separation apparatus 10 may be installed in a line for withdrawing sludge in the filtration concentration apparatus or at a bottom portion of the filtration concentration apparatus. Since operation of the filtration concentration apparatus is intermittent, the concentrated sludge is temporarily stored in the filtration concentration apparatus and withdrawal of the sludge is carried out from a lower portion thereof. Therefore, supernatant liquid stored above the sludge upon this temporary storage is withdrawn together with the concentrated sludge. Thereby, there is a problem similar to the above described problem in the first example, but by use of the screw conveyor type separation apparatus 10 according to this embodiment, when the sludge is withdrawn, the supernatant liquid (supernatant water) is able to be separated, and thus the concentration of the concentrated sludge is able to be increased stably.

REFERENCE SIGNS LIST 1, 2 WASTEWATER TREATMENT SYSTEM
10, 20 SCREW CONVEYOR TYPE SEPARATION APPARATUS
11 CASING
11a INPUT PORT
11b, 11d DRAINAGE PORT
11c SLIT
12 SCREW SHAFT
13 FIRST SCREW BLADE
14 SECOND SCREW BLADE
15 BAFFLE
16 SCREW COVER
17 SEPARATED LIQUID
18 SLUDGE
31, 44 SEDIMENTATION TANK
32, 42 PRESTAGE FACILITY
33 POSTSTAGE FACILITY
34, 43a, 43b WITHDRAWING PUMP
41 REACTION TANK
O SHAFT CENTER
Q CONCENTRATION ZONE
R SEPARATED LIQUID ZONE

The invention claimed is:

1. A screw conveyor type separation apparatus, comprising:
a casing having an opening provided at one of end portions thereof, the opening enabling a treatment object that has been squeezed to be discharged therefrom, the casing having a substantially cylindrical shape;
a screw shaft penetrating inside the casing along a longitudinal direction of the cylindrical shape of the casing;
a first screw blade that is spirally provided on an outer peripheral surface of the screw shaft in the casing and that rotates with rotation of the screw shaft around a shaft center thereof; and
a second screw blade that is spirally provided on the outer peripheral surface of the screw shaft in the casing, that is provided side by side with the first screw blade with a predetermined interval from the first screw blade, along a longitudinal direction of the screw shaft, and that rotates with the rotation of the screw shaft around the shaft center thereof, wherein
in the casing, a first region and a second region substantially divided from each other by the first screw blade and the second screw blade are formed, and
the screw conveyor type separation apparatus is configured to be able to, by the rotation of the screw shaft:
in the first region, squeeze the treatment object while moving the treatment object in a predetermined direction towards the one of end portions, separate a liquid component from the treatment object, and move the liquid component to the second region; and
in the second region, move the liquid component oppositely to the predetermined direction and discharge the liquid component to outside.

2. The screw conveyor type separation apparatus according to claim 1, wherein a cylindrical inner peripheral side surface of the casing and the first screw blade and second screw blade have a gap therebetween, the gap allowing the liquid component to pass therethrough, and not allowing the treatment object to pass therethrough.

3. The screw conveyor type separation apparatus according to claim 1, wherein at the other end portion opposite to the one of end portions of the casing, a drainage port configured to allow the liquid component to be discharged therefrom is formed.

4. The screw conveyor type separation apparatus according to claim 3, wherein the drainage port is formed lower than the screw shaft along a vertical direction.

5. The screw conveyor type separation apparatus according to claim 3, wherein the drainage port is formed upper than the screw shaft along a vertical direction.

6. The screw conveyor type separation apparatus according to claim 1, wherein the one of end portions of the casing is reduced in diameter.

7. The screw conveyor type separation apparatus according to claim 1, wherein a separated liquid damming means that dams up the liquid component is provided between the first screw blade and the second screw blade near the one of end portions in the second region.

8. The screw conveyor type separation apparatus according to claim 1, wherein
the casing has an input port configured to allow the treatment object to be fed into the casing, and
a cover is provided between the first screw blade and the second screw blade, the cover covering at least an overlapping region along a horizontal direction between the input port and the second region.

9. A wastewater treatment system, comprising:
a solid-liquid separation tank for separating sludge from organic wastewater; and
the screw conveyor type separation apparatus according to claim 1, wherein
the screw conveyor type separation apparatus is configured to be able to concentrate the sludge discharged from the solid-liquid separation tank and return, to the solid-liquid separation tank, the separated liquid generated upon the concentration of the sludge.

10. The wastewater treatment system according to claim 9, wherein the screw conveyor type separation apparatus is provided in the solid-liquid separation tank.

11. A wastewater treatment system, comprising:
a reaction tank for performing biological treatment on organic wastewater;
a solid-liquid separation tank for separating sludge from the organic wastewater; and
the screw conveyor type separation apparatus according to claim 1, wherein
the screw conveyor type separation apparatus is configured to be able to withdraw sludge from the reaction tank and concentrate the sludge, return the concentrated sludge to the reaction tank, and supply, to the solid-liquid separation tank, the separated liquid generated upon the concentration of the sludge.

* * * * *